(12) United States Patent
Eigler et al.

(10) Patent No.: US 7,971,465 B2
(45) Date of Patent: Jul. 5, 2011

(54) PLANAR BEAM DUMP

(75) Inventors: Lynne C. Eigler, Simi Valley, CA (US);
Yan S. Tam, Oak Park, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 12/651,344

(22) Filed: Dec. 31, 2009

(65) Prior Publication Data

US 2010/0175454 A1 Jul. 15, 2010

Related U.S. Application Data

(62) Division of application No. 11/549,915, filed on Oct. 16, 2006, now abandoned.

(51) Int. Cl.
*B21C 25/08* (2006.01)

(52) U.S. Cl. ............ 72/260; 72/253.1; 72/467

(58) Field of Classification Search ........ 72/253.1, 72/260, 261, 462, 467, 262, 263, 264, 468
See application file for complete search history.

(56) References Cited

U.S. PATENT DOCUMENTS

| | | | | |
|---|---|---|---|---|
| 2,341,749 A * | 2/1944 | Webb | | 72/467 |
| 2,716,805 A * | 9/1955 | Reed | | 72/256 |
| 2,748,934 A * | 6/1956 | Wheeler | | 72/260 |
| 2,872,037 A * | 2/1959 | Ausel et al. | | 72/264 |
| 2,950,817 A * | 8/1960 | Graham | | 72/261 |
| 2,968,835 A * | 1/1961 | Weston, Jr. et al. | | 72/272 |
| 3,286,502 A * | 11/1966 | Cogan | | 72/259 |
| 3,585,834 A * | 6/1971 | De Bruyn et al. | | 72/260 |
| 4,068,517 A * | 1/1978 | Fuchs, Jr. | | 72/253.1 |
| 4,187,711 A * | 2/1980 | Lavochkin et al. | | 72/256 |
| 4,208,898 A * | 6/1980 | Ames et al. | | 72/258 |
| 4,571,983 A * | 2/1986 | Sanborn et al. | | 72/462 |
| 6,176,064 B1 * | 1/2001 | Janelle | | 52/749.1 |

FOREIGN PATENT DOCUMENTS

| | | | |
|---|---|---|---|
| JP | 55-120414 | * | 9/1980 |
| JP | 4-41014 | * | 2/1992 |
| JP | 6-285539 | * | 10/1994 |

* cited by examiner

*Primary Examiner* — Edward Tolan
(74) *Attorney, Agent, or Firm* — Haynes & Boone, LLP.

(57) ABSTRACT

In one embodiment, a device for capturing radiation includes: a panel defining a plurality of double wedge chambers, wherein each double wedge chamber includes a first wedge-shaped chamber that tapers into an opening for a second wedge-shaped chamber, and wherein a longitudinal axis of the first wedge-shaped chamber is not collinear with a longitudinal axis of the second wedge-shaped chamber.

6 Claims, 3 Drawing Sheets

PLANAR BEAM DUMP

CROSS REFERENCE

This patent application is a Divisional patent application of U.S. application Ser. No. 11/549,915, filed Oct. 16, 2006.

STATEMENT REGARDING FEDERALLY SPONSORED RESEARCH OR DEVELOPMENT

This invention was made with Government support under contract number USZA22-02-C-0049. The Government has certain rights in this invention.

TECHNICAL FIELD

The present invention relates generally to systems for the capture of energy such as laser energy.

BACKGROUND OF THE INVENTION

While in use, a laser beam is directed at the desired workpiece. For example, in the field of laser welding, the workpiece would be the material being welded. There are periods, however, when laser beams are activated but are not directed at the workpiece, such as during laser beam alignment. There are also instances during operation when a portion of a laser beam is not directed toward the workpiece, such as occurs when a beam splitter in the system creates secondary reflections. A portion of the beam may also need to be safely captured when only a fraction of the laser beam is sent to a sensor to avoid saturating the sensor. Yet another instance during operation when the laser beam is inadvertently directed off the workpiece, such as when one or more of the beam relay optics malfunctions or is miscontrolled.

Because laser beams can injure eyes and damage surrounding hardware during such periods, they must be captured and appropriately terminated in a beam dump. The use of a beam dump is particularly important in high-power or high-energy laser applications, given the potential damage high-power or high-energy laser beams can inflict on equipment and personnel.

One type of beam dump suitable for high-power or high-energy applications (such as kilowatt or megawatt laser output) includes a conical copper reflector within a cylindrical copper housing. The interior of the cylindrical housing is coated with absorbent material such as carbon or graphite so that laser energy reflected from the conical copper reflector is absorbed by the beam dump. After sustained use, the copper reflector and/or the beam dump surfaces may exhibit surface temperatures of several hundred degrees Celsius such that forced air or water cooling of the beam dump through cooling channels may be necessary. The resulting weight of the required amount of copper and cooling apparatus makes copper beam dumps relatively heavy, making their use in airborne applications problematic. Moreover, the housing must be made long in length to reduce the intensity of the beam on the walls of the same, resulting in beam dumps being relatively large in size and their use in airborne applications challenging. In addition, such conventional beam dumps are difficult and expensive to fabricate. Moreover, diffuse backscatter of laser energy from conventional beam dump surfaces is also problematic, especially in low power applications where the signal-to-noise ratio in associated detectors is especially critical.

Accordingly, there is a need in the art for light-weight and compact laser beam dumps that can terminate laser beams with a minimal amount of backscatter.

SUMMARY OF THE INVENTION

In accordance with a first aspect of the invention, a device is provided for capturing radiation. The device includes: a panel defining a plurality of double wedge chambers, wherein each double wedge chamber includes a first wedge-shaped chamber that tapers into an opening for a second wedge-shaped chamber, and wherein a longitudinal axis of the first wedge-shaped chamber is not collinear with a longitudinal axis of the second wedge-shaped chamber.

In accordance with another aspect of the invention, a method of manufacturing a device is provided. The method includes the acts of: providing a die having an aperture that defines a plurality of double wedge chambers, each double wedge chamber including a first wedge-shaped chamber that tapers into an opening for a second wedge-shaped chamber; and extruding a metal through the aperture in the die to form an extruded metal structure that includes the plurality of double wedge chambers.

In accordance with another aspect of the invention, a device for capturing radiation is provided that includes: a panel that defines a plurality of chambers arranged in parallel rows; wherein each chamber comprises a first wedge-shaped chamber having an open end that tapers to a truncated second end along a first axis and a second wedge-shaped chamber having an open first end in communication with the truncated second end of the first wedge-shaped chamber, the second wedge-shaped chamber tapering to a vertex along a second axis that is not collinear with the first axis.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE EMBODIMENT(S)

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
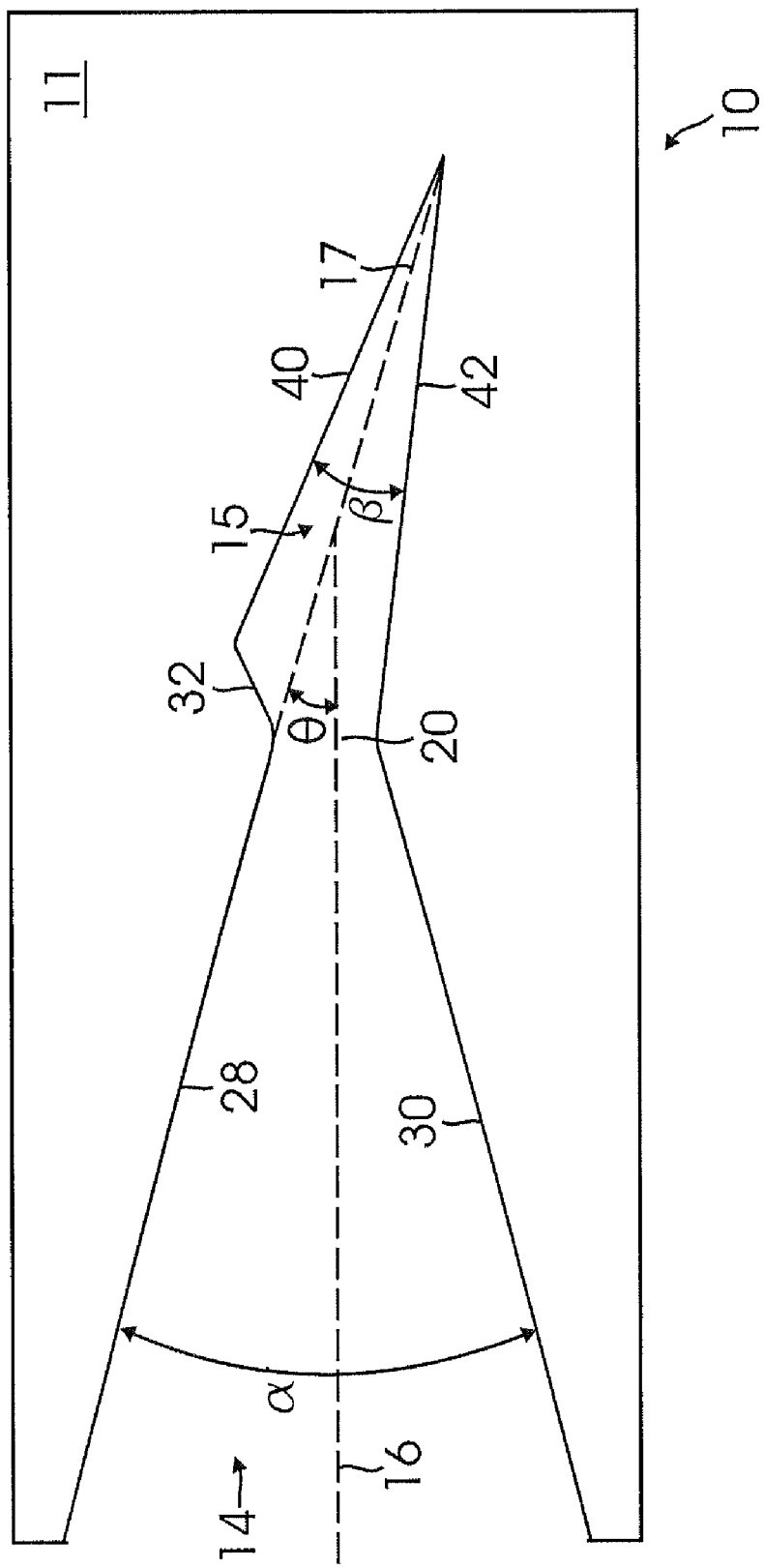
FIG. 1 shows a cross sectional view of a double wedge chamber in accordance with an embodiment of the present invention.

A beam capture device is provided that exploits the advantageous geometry disclosed in commonly assigned U.S. Pat. No. 7,071,444, the contents of which are incorporated by reference in their entirety. FIG. 1 shows a side view of an exemplary beam capture device 10 having this geometry. A housing 11 defines a first wedge-shaped chamber 14 having first and second faces 28 and 30 that define an angle α between them. Chamber 14 is a truncated wedge in that faces 28 and 30 do not meet at a vertex but instead define an opening into a second wedge-shaped chamber 15. Second chamber 15 is defined by third and fourth faces 40 and 42 that define an angle β between them. Given the presence of two wedges 14 and 15, beam capture device 10 may be denoted as a "double wedge" absorber.

First chamber 14 has a longitudinal axis 16 that is not collinear with a longitudinal axis 17 of second chamber 15. Instead, axis 17 is tilted with respect to axis 16 by a tilt angle θ such fourth face 42 connects to second face 30. In an embodiment of the double wedge system, the angle between the two chambers, for example, may be 14.5 degrees. In contrast, first face 28 and third face 40 are not directly connected but instead connect through a fifth face 32. The tilting of second chamber 15 with respect to first chamber 14 prevents any radiation incident along or adjacent to longitudinal axis 16 from directly impinging with the vertex of second chamber 15. Because of the tilt angle, such radiation must reflect from third face 40 as it propagates into second chamber 15. The values for α, β, and θ are selected to minimize backscatter while maximizing the absorption of energy across a large portion of chambers 14 and 15. This helps minimize local heating and helps ensure that any local heating is safely below the material limits of housing 10. In general, such goals are achieved by making β less than a. For example, by way of non-limiting example, in one embodiment the angle α has a value of around 28° to around 32° whereas β equals around 15°, and theta ranges from around 13 to 16 degrees.

The faces of chambers 14 and 15 are preferably coated with a coating having an appropriate coefficient of absorption. Angling and coating of the faces minimizes local heating of any surface within the beam capture device by allowing a prescribed amount of the beam's energy to be absorbed in first chamber 14 and the remainder to be absorbed in second chamber 15. If the absorption coefficient of the coating is too low then the majority of the beam absorption must occur in second chamber 15. For a high power beam, this may cause unacceptable "hot spots" on the faces of second chamber 15. Similarly, if the absorption coefficient of the coating is too high, the amount of energy absorption that occurs in first chamber 14 may be unacceptably high and again result in local hot spots. In one embodiment, first and second faces 28 and 30 are coated with a coating of Ebonol C. Given by way of non-limiting example, other suitable coatings that may be used on first and second faces 28 and 30 include tungsten, tungsten carbide, silicon carbide, black chrome, black nickel, black oxide, black paint, and the like. Similar to first and second faces 28 and 30, third and fourth faces 40 and 42 may also be coated to mitigate effects of excessive local absorption and heating of the beam capture device while promoting a controlled absorption of the energy. Thus, faces 40 and 42 may be coated with Ebonol C, tungsten, tungsten carbide, silicon carbide, black chrome, black oxide, black paint, or the like.

Figure 2:
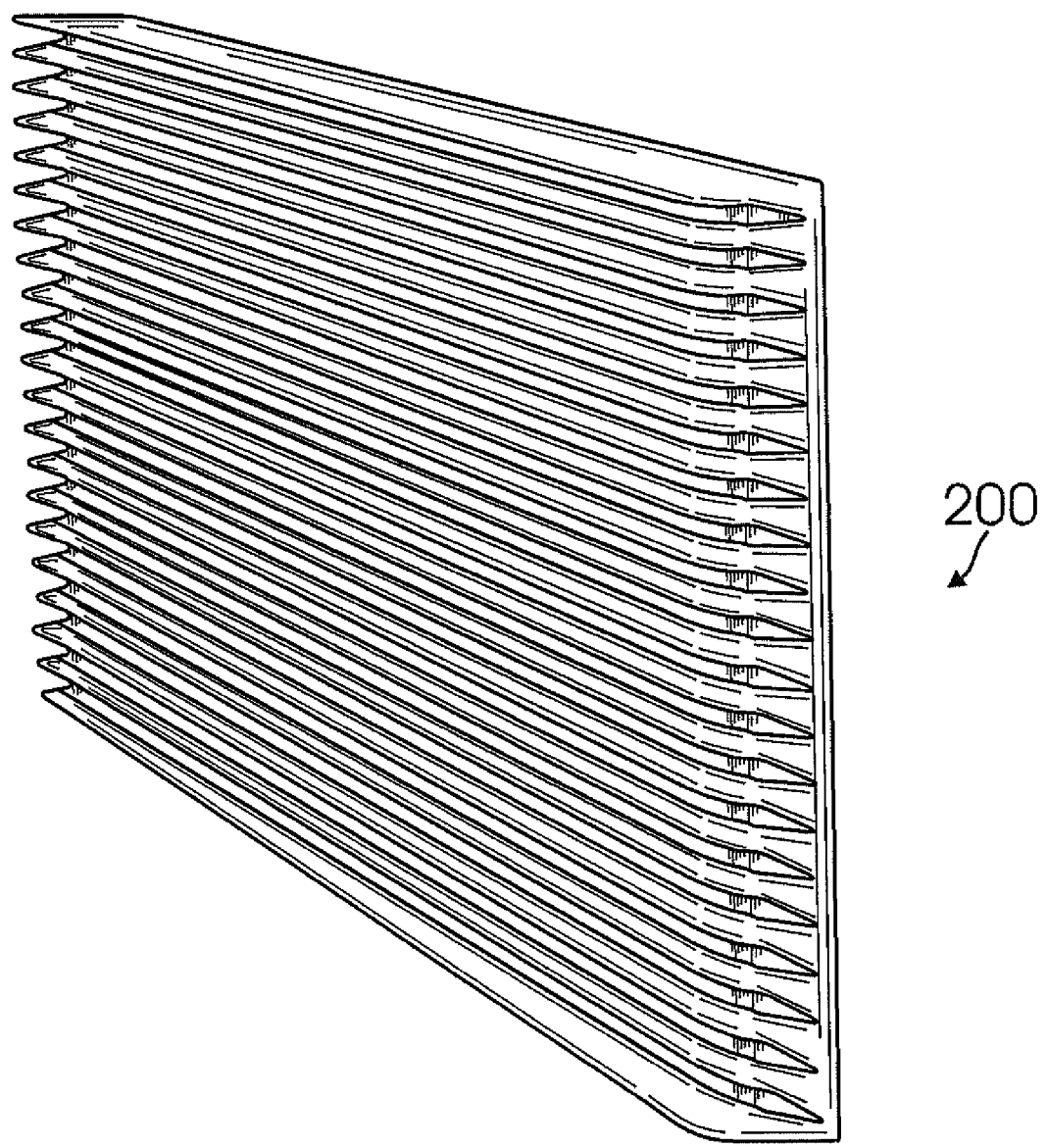
FIG. 2 is a perspective view of a beam dump that includes a plurality of the double wedge chamber shown in FIG. 2.
Figure 3:
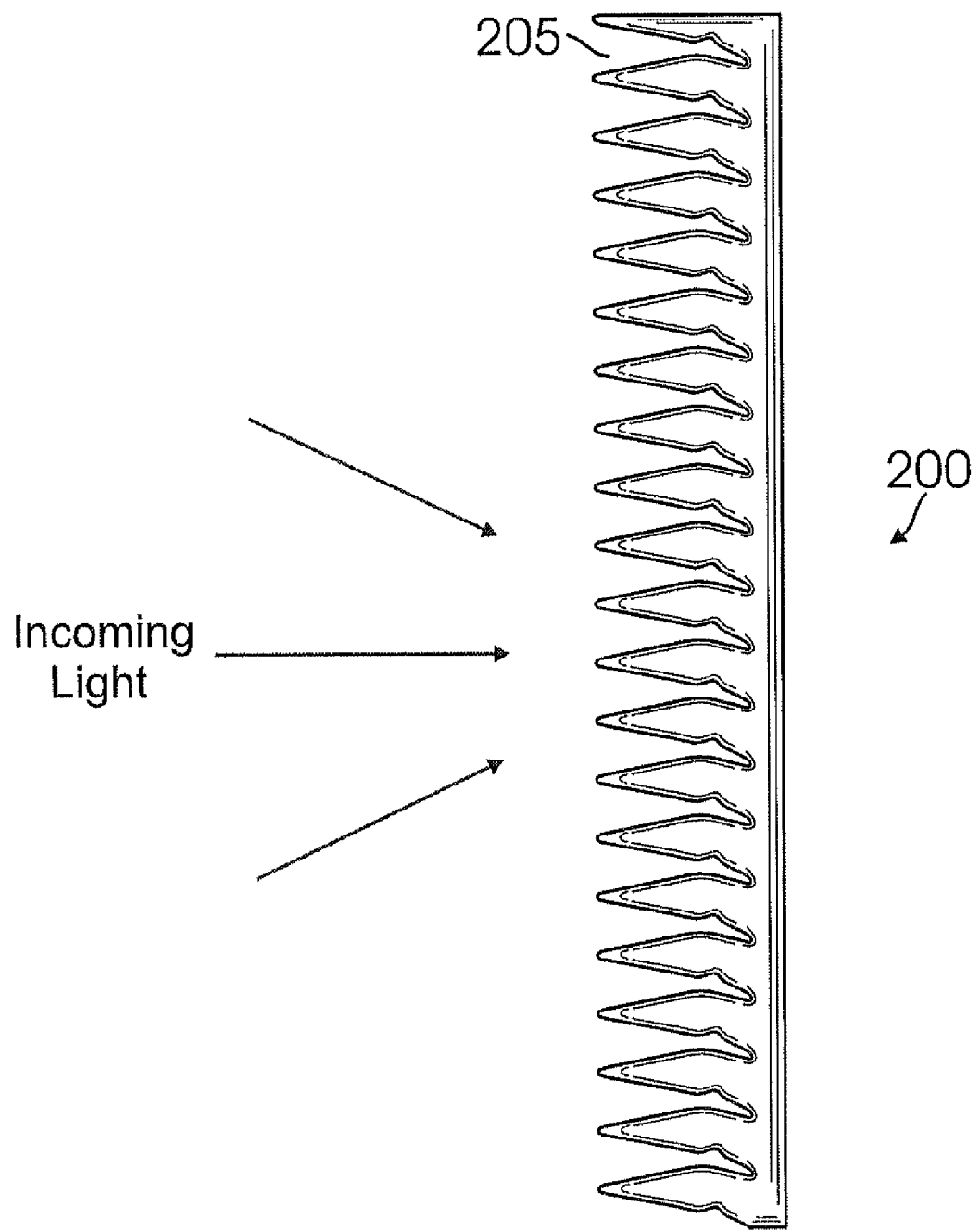
FIG. 3 is a cross-sectional view of the beam dump of FIG. 2.

To provide a compact design for a given laser beam size, the double wedge design discussed with regard to FIG. 1 is repeated to provide a beam dump 200 having a plurality of double wedge chambers as illustrated in FIG. 2. Each double wedge chamber extends linearly across beam dump 200. As illustrated, these linear extensions may be arranged in rows. It will be appreciated, however, that the double wedge chambers may be arranged in columns or in some other orientation across beam dump 200. A cross-sectional view of beam dump 200 is illustrated in FIG. 3. As seen in FIG. 2, double wedge chambers 205 are arranged in parallel linear rows such that beam dump 200 is a planar rectangular structure. It will be appreciated, however, that the beam dump 200 geometry may be configured in other than rectangular, such as for example circular or elliptical or whatever is suitable for the desired application to fully capture the incident laser beam. Moreover, it will be appreciated, however, that the double wedges may be repeated in a non-planar structure. Note that virtually no material of beam dump 200 is normally oriented to the incoming light energy even as the direction of incidence for the incoming light is widely varied. Because it is normal incidence that produces the most backscatter, beam dump 200 advantageously provides a greatly reduced amount of backscattered energy as compared to conventional beam dumps. Moreover, because the double wedges are repeated to form a panel, beam dump 200 is advantageously more compact when compared to using a single double wedge design for a given size of laser beam to be captured. Moreover, the exact number of double wedges may be optimized for the laser energy and packaging envelope.

Beam dump 200 may be readily manufactured by forming an extrusion die having an aperture matching the cross-section illustrated in FIG. 3. A suitable metallic ingot such as, for example, aluminum or copper is then heated and extruded through the die to form beam dump 200. Aluminum is cheaper and lighter than copper but copper is a better conductor of heat. Thus, copper would be preferred for high energy applications whereas aluminum would perform adequately for less energetic applications. Other metals or metal alloys may also be used to form beam dump 200. The width for the die aperture (and hence the width for beam dump 200) may be of almost any arbitrary thickness. In that regard, as the beam dump is made thinner, a smaller amount of energy may be absorbed because the thermal mass of a thinner plate is relatively low. It will be appreciated that beam dump 200 may be molded or machined rather than extruded. Regardless of the process used to form beam dump 200, it may then be coated with the appropriate coating to complete its manufacture.

Embodiments described above illustrate but do not limit the invention. For example, a triple wedge as discussed in U.S. Pat. No. 7,071,444 rather than a double wedge may be repeated to form beam dump 200. It should also be understood that numerous modifications and variations are possible in accordance with the principles of the present invention. Accordingly, the scope of the invention is defined only by the following claims.

What is claimed is:

1. A method of manufacturing a device, comprising:
providing a die having an aperture that defines a plurality of double wedge chambers, each double wedge chamber including a truncated first wedge-shaped chamber defined by two faces that taper from a wider end into a narrower end that intersects with an opening for a wider end of a second non-truncated wedge-shaped chamber, the second wedge-shaped chamber defined by two faces tapering to a vertex and having a longitudinal axis that is not collinear with a longitudinal axis of the first wedge-shaped chamber; and extruding a metal through the aperture in the die to form an extruded metal structure that includes the plurality of double wedge chambers.

2. The method of claim 1, further comprising:

coating the double wedge chambers of the extruded metal structure with an absorptive coating.

3. The method of claim 2, wherein the coating is selected from the group consisting of Ebonol C, tungsten, tungsten carbide, silicon carbide, black chrome, and black oxide.

4. The method of claim 1, wherein the metal is selected from the group consisting of copper and aluminum.

5. The method of claim 1, wherein extruding the metal through the aperture forms the extruded metal structure into a panel.

6. The method of claim 5, wherein the panel is a planar panel.

* * * * *